US008215425B2

(12) United States Patent
Hayashi et al.

(10) Patent No.: US 8,215,425 B2
(45) Date of Patent: Jul. 10, 2012

(54) VEHICLE AND VEHICLE CONTROL METHOD

(75) Inventors: Kazuhito Hayashi, Inazawa (JP); Masaki Okamura, Toyota (JP); Hideto Hanada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 987 days.

(21) Appl. No.: 12/224,445

(22) PCT Filed: Feb. 23, 2007

(86) PCT No.: PCT/JP2007/053427
§ 371 (c)(1),
(2), (4) Date: Aug. 27, 2008

(87) PCT Pub. No.: WO2007/099879
PCT Pub. Date: Sep. 7, 2007

(65) Prior Publication Data
US 2009/0025992 A1  Jan. 29, 2009

(30) Foreign Application Priority Data
Feb. 28, 2006  (JP) ................................. 2006-052966
Sep. 14, 2006  (JP) ................................. 2006-249963

(51) Int. Cl.
*B60K 6/36* (2007.10)
*B60W 20/00* (2006.01)
(52) U.S. Cl. .................. 180/65.265; 903/902
(58) Field of Classification Search ............. 180/65.265, 180/65.21, 65.22, 65.225, 65.24; 477/3, 477/34, 107, 111; 903/902, 905, 906, 945, 903/946
See application file for complete search history.

(56) References Cited

U.S. PATENT DOCUMENTS

| | | | |
|---|---|---|---|
| 5,934,395 A | 8/1999 | Koide et al. | |
| 6,247,437 B1* | 6/2001 | Yamaguchi et al. | 123/179.3 |
| 7,497,285 B1* | 3/2009 | Radev | 180/65.225 |
| 2001/0022166 A1 | 9/2001 | Yamaguchi et al. | |
| 2008/0093137 A1* | 4/2008 | Maeda et al. | 180/65.2 |

FOREIGN PATENT DOCUMENTS

| | | |
|---|---|---|
| JP | A-09-170533 | 6/1997 |
| JP | A-11-153075 | 6/1999 |
| JP | A-2001-234837 | 8/2001 |
| JP | A-2005-299406 | 10/2005 |
| JP | A-2005-329787 | 12/2005 |

* cited by examiner

Primary Examiner — J. Allen Shriver, II
Assistant Examiner — Bridget Avery
(74) Attorney, Agent, or Firm — Oliff & Berridge, PLC

(57) ABSTRACT

In response to a starting instruction of an engine 22 at a gearshift position of a gearshift lever 81 set to a parking position, the engine 22 and motors MG1 and MG2 are controlled to motor and start the engine 22 with output of a torque from the motor MG2 to keep a rotational position of a rotor in the motor MG2 at a preset reference position. This arrangement enables the engine 22 to be motored and started even in the state of separation of a ring gear shaft 32*a* from a driveshaft 36 by means of a transmission 60 and locking of drive wheels 39*a* and 39*b* by means of a parking lock mechanism 90.

18 Claims, 10 Drawing Sheets

VEHICLE AND VEHICLE CONTROL METHOD

TECHNICAL FIELD

The present invention relates to a vehicle and a control method of the vehicle.

BACKGROUND ART

A proposed configuration of a vehicle includes an engine, a planetary gear mechanism constructed to have a carrier linked with an output shaft of the engine and a ring gear linked with an axle, a first motor configured to input and output power from and to a sun gear of the planetary gear mechanism, and a second motor configured to input and output power from and to the ring gear (see, for example, Patent Document 1). During parking of the vehicle having this configuration, in response to an engine start instruction, upon satisfaction of an axle lock condition by a parking brake, the engine is motored by means of the first motor to start in a fixed state of the ring gear.

Patent Document 1: Japanese Patent Laid-Open No. H09-170533

DISCLOSURE OF THE INVENTION

In a vehicle equipped with a transmission located between the ring gear of the planetary gear mechanism and the axle in addition to the above constituents, at a gearshift position of a gearshift lever set to a parking position, the ring gear is generally separated from the axle by means of the transmission, while drive wheels are locked. When an engine start instruction is given to motor and start the engine by means of the first motor in this state, cancellation of a torque applied on the ring gear is required. Otherwise the ring gear is rotated to interfere with motoring of the engine.

In a vehicle equipped with a motoring structure and a transmission configured to allow and prohibit transmission of power with a change of a change gear ratio between a rotating shaft and an axle of the vehicle and a control method of such a vehicle, there would thus be a demand for enabling a start of an internal combustion engine even at a gearshift position of a gearshift lever set to a parking position.

The present invention accomplishes at least part of the demands mentioned above by the following configurations applied to the vehicle and the vehicle control method.

According to a first aspect of the invention, the present invention is directed to a vehicle. The vehicle includes: an internal combustion engine; a motoring structure connected with an output shaft of the internal combustion engine and with a rotating shaft and configured to motor the internal combustion engine with output of power to the rotating shaft; a motor configured to input and output power from and to the rotating shaft; a transmission configured to allow and prohibit transmission of power with a change in speed between the rotating shaft and an axle of the vehicle; and a start controller configured to control the internal combustion engine, the motoring structure, and the motor, in response to a starting instruction of the internal combustion engine at a gearshift position of a gearshift lever set to a parking position, to motor and start the internal combustion engine with output of power from the motor for restricting rotation of the rotating shaft.

In response to a starting instruction of the internal combustion engine at the gearshift position of the gearshift lever set to the parking position, the vehicle according to this aspect of the invention controls the internal combustion engine, the motoring structure, and the motor to motor and start the internal combustion engine with output of power from the motor for restricting rotation of the rotating shaft. At the gearshift position of the gearshift lever set to the parking position, while a locking mechanism generally works to lock drive wheels, the transmission separates the rotating shaft from the axle of the vehicle to prohibit transmission of power from the rotating shaft to the axle. The transmission is designed to allow and prohibit transmission of power with a change in speed between the rotating shaft and the axle. In the case of motoring the internal combustion engine to start in this state, it is required to cancel a driving force applied to the rotating shaft by motoring of the internal combustion engine. The vehicle of this aspect of the invention controls the motor to output power to the rotating shaft for restricting rotation of the rotating shaft. The output power of the motor effectively cancels out the driving force applied to the rotating shaft by motoring of the internal combustion engine and thereby enables the internal combustion engine to be motored and started. The transmission may be constructed to have multiple clutches and designed to allow and prohibit transmission of power with a change in speed between the rotating shaft and the axle by changing coupling and releasing conditions of the multiple clutches. The terminology 'clutch' in the specification hereof includes a brake arranged to fix one rotating system to a non-rotating system like a casing, as well as a general clutch arranged to interconnect two rotating systems.

In one preferable embodiment of the invention, the vehicle further has a rotational position detector configured to detect a rotational position of the rotating shaft. The start controller controls the motor to keep the detected rotational position of the rotating shaft within a predetermined positional range including a preset reference position. The vehicle of this arrangement enables the internal combustion engine to be motored and started with reducing a potential deviation of the rotational position of the rotating shaft. In the vehicle of this arrangement, the start controller may feedback control the motor to cancel a difference between the detected rotational position of the rotating shaft and the preset reference position.

In another preferable embodiment of the invention, the vehicle further has a rotation speed sensor configured to measure a rotation speed of the rotating shaft. The start controller controls the motor to keep the measured rotation speed of the rotating shaft within a preset rotation speed range including a value '0'. The vehicle of this arrangement enables the internal combustion engine to be motored and started with reducing a potential deviation of the rotation speed of the rotating shaft. In the vehicle of this arrangement, the start controller may feedback control the motor to make the measured rotation speed of the rotating shaft equal to 0.

In one preferable application of the vehicle according to the above aspect of the invention, in response to the starting instruction of the internal combustion engine at a time of system activation of the vehicle, the start controller controls the internal combustion engine, the motoring structure, and the motor to motor and start the internal combustion engine with output of the power from the motor for restricting rotation of the rotating shaft. The vehicle of this application enables the internal combustion engine to be motored and started at the time of system activation of the vehicle.

In another preferable application of the vehicle according to the above aspect of the invention, the motoring structure includes: a three shaft-type power input output assembly connected with three shafts, the output shaft of the internal combustion engine, the rotating shaft, and a third shaft and designed to input and output power to a residual shaft based on powers input from and output to any two shafts among the three shafts; and a generator configured to input and output power from and to the third shaft.

According to a second aspect of the invention, the present invention is directed to a vehicle. The vehicle includes: an internal combustion engine; a motoring structure connected with an output shaft of the internal combustion engine and with a rotating shaft and configured to motor the internal combustion engine with output of power to the rotating shaft; a motor configured to input and output power from and to the rotating shaft; a transmission configured to allow and prohibit transmission of power with a change in speed between the rotating shaft and an axle of the vehicle; and a start controller configured to control the internal combustion engine, the motoring structure, and the motor, in response to a starting instruction of the internal combustion engine at a gearshift position of a gearshift lever set to a parking position, to motor and start the internal combustion engine with restriction of rotation of the rotating shaft by the motor.

In response to a starting instruction of the internal combustion engine at the gearshift position of the gearshift lever set to the parking position, the vehicle according to this aspect of the invention controls the internal combustion engine, the motoring structure, and the motor to motor and start the internal combustion engine with restriction of rotation of the rotating shaft. As mentioned above, at the gearshift position of the gearshift lever set to the parking position, while the locking mechanism generally works to lock the drive wheels, the transmission separates the rotating shaft from the axle of the vehicle. In the case of motoring the internal combustion engine to start in this state, it is required to cancel a driving force applied to the rotating shaft by motoring of the internal combustion engine. The vehicle of this aspect of the invention controls the motor to restrict rotation of the rotating shaft and cancel out the driving force applied to the rotating shaft by motoring of the internal combustion engine and thereby enables the internal combustion engine to be motored and started. The transmission may be constructed to have multiple clutches and designed to allow and prohibit transmission of power with a change in speed between the rotating shaft and the axle by changing coupling and releasing conditions of the multiple clutches. The terminology 'clutch' in the specification hereof includes a brake arranged to fix one rotating system to a non-rotating system like a casing, as well as a general clutch arranged to interconnect two rotating systems.

In one preferable application of the vehicle according to this aspect of the invention, the motor has a rotor connected with the rotating shaft and a stator arranged to drive and rotate the rotor by formation of a rotating magnetic field and accordingly enable power input and power output from and to the rotating shaft. The start controller controls the motor to fix a direction of the magnetic field formed on the stator and accordingly prevent rotation of the rotor. In the vehicle of this application, fixation of the direction of the magnetic field formed on the stator effectively prevents rotation of the rotor.

In the vehicle of the application controlling the motor to fix the direction of the magnetic field on the stator and prevent rotation of the rotor, the start controller may apply a direct current to the motor to fix the direction of the magnetic field formed on the stator. In the vehicle of this arrangement, application of the direct current to the motor effectively prevents rotation of the rotor.

In one preferable embodiment of the invention, the vehicle of the application controlling the motor to fix the direction of the magnetic field on the stator and prevent rotation of the rotor further includes: a rotational position detector configured to detect a rotational position of the rotor in the motor; and a starting rotational position setting module configured to, at the gearshift position of the gearshift lever set to the parking position, set a starting rotational position equal to the detected rotational position before the start controller starts motoring the internal combustion engine. The start controller controls the motor with the set starting rotational position to prevent rotation of the rotor. The vehicle of this embodiment uses the starting rotational position to prevent rotation of the rotor.

In one preferable application of the vehicle of this embodiment using the starting rotational position to prevent rotation of the rotor, the start controller applies an electric current to the motor to make the direction of the magnetic field formed on the stator substantially identical with a direction of a magnetic flux based on a field of the rotor at the set starting rotational position. This arrangement effectively prevents rotation of the rotor on the balance of the driving force applied to the rotating shaft by motoring of the internal combustion engine with the driving force corresponding to the deviation of the direction of the magnetic flux based on the field of the rotor and the direction of the magnetic field on the stator.

In another preferable application of the vehicle of this embodiment using the starting rotational position to prevent rotation of the rotor, the motor is a multiphase alternating current motor, and the start controller calculates rotating coordinate system currents, which represent electric currents in a rotating coordinate system rotating in synchronism with rotation of the rotor, from electric currents applied to respective phases of the motor, calculates rotating coordinate system target voltages, which represent target voltages in the rotating coordinate system, from the calculated rotating coordinate system currents, calculates target voltages to be applied to the respective phases of the motor from the calculated rotating coordinate system target voltages, and controls the motor with the calculated target voltages to prevent rotation of the rotor.

In one preferable embodiment of the vehicle using the rotating coordinate system for controlling the motor, the motor is a three-phase alternating current motor. The start controller converts electric currents applied to respective phases of the motor to a d-axis current and a q-axis current as the rotating coordinate system currents by three phase-to-two phase conversion, sets a fixed value to a d-axis target current and a value '0' to a q-axis target current at the set starting rotational position, and sets a d-axis target voltage based on the set d-axis target current and the converted d-axis current and a q-axis target voltage based on the set q-axis target current and the converted q-axis current, as the rotating coordinate system target voltages. The vehicle of this embodiment uses the d-axis current at the starting rotational position to prevent rotation of the rotor.

In one preferable application of the vehicle using the rotating coordinate system for controlling the motor, the start controller calculates the rotating coordinate system currents from the set starting rotational position and the electric currents applied to the respective phases of the motor. In another preferable application of this vehicle, the start controller calculates the target voltages from the set starting rotational position and the calculated rotating coordinate system target voltages. In still another preferable application of this vehicle, the start controller estimates a current rotational position of the rotor based on the set starting rotational position immediately after the starting rotational position setting module sets the starting rotational position, and calculates the target voltages from the estimated current rotational position of the rotor and the calculated rotating coordinate system target voltages.

In one preferable embodiment of the invention, the vehicle of the application using the starting rotational position to prevent rotation of the rotor further has a rotation stop checking module configured to check whether the rotor is substantially at stop, based on the detected rotational position and the set starting rotational position. The vehicle of this embodiment identifies rotation or non-rotation of the rotor according to the detected rotational position and the set starting rotational position.

In another preferable application of the vehicle using the starting rotational position to prevent rotation of the rotor, the starting rotational position setting module sets the starting rotational position equal to a rotational position detected after application of a sufficient electric current to the motor for preventing rotation of the rotor. The start controller controls the internal combustion engine, the motoring structure, and the motor to motor and start the internal combustion engine with prevention of rotation of the rotor after the starting rotational position setting module sets the starting rotational position. This arrangement effectively prevents an increase in rotation of the rotor in the motor, compared with an arrangement of setting the starting rotational position equal to a rotational position detected prior to application of the sufficient electric current to the motor for preventing rotation of the rotor.

In one preferable embodiment of the vehicle setting the starting rotational position equal to the rotational position detected after application of the sufficient electric current to the motor for preventing rotation of the rotor, the motor is a three-phase alternating current motor. The vehicle further has an electric current level detector configured to convert electric currents applied to respective phases of the motor to a d-axis current and a q-axis current by three phase-to-two phase conversion at the gearshift position of the gearshift lever set to the parking position and to determine application of a sufficient electric current to the motor for preventing rotation of the rotor when the converted d-axis current is within a preset electric current range including a specific electric current value. The starting rotational position setting module sets the starting rotational position based on a result of the determination by the electric current level detector. The vehicle of this embodiment adequately identifies whether the sufficient electric current for preventing rotation of the rotor is applied to the motor.

In another preferable embodiment of the vehicle setting the starting rotational position equal to the rotational position detected after application of the sufficient electric current to the motor for preventing rotation of the rotor, the start controller controls the motor to prevent input and output of a driving force from and to the rotating shaft before the starting rotational position setting module sets the starting rotational position.

In the vehicle of the application controlling the motor to fix the direction of the magnetic field on the stator and prevent rotation of the rotor, the start controller may control the motor to prevent rotation of the rotor and control the motoring structure to start motoring the internal combustion engine in a state of preventing rotation of the rotor. The vehicle of this arrangement can start motoring the internal combustion engine in the state of preventing rotation of the rotor.

In one preferable application of the vehicle according to this aspect of the invention, the motoring structure includes: a three shaft-type power input output assembly connected with three shafts, the output shaft of the internal combustion engine, the rotating shaft, and a third shaft and designed to input and output power to a residual shaft based on powers input from and output to any two shafts among the three shafts; and a generator configured to input and output power from and to the third shaft.

Another aspect of the invention, the present invention is directed to a control method of a vehicle. The vehicle includes: an internal combustion engine; a motoring structure connected with an output shaft of the internal combustion engine and with a rotating shaft and configured to motor the internal combustion engine with output of power to the rotating shaft; a motor configured to input and output power from and to the rotating shaft; and a transmission configured to allow and prohibit transmission of power with a change in speed between the rotating shaft and an axle of the vehicle. In response to a starting instruction of the internal combustion engine at a gearshift position of a gearshift lever set to a parking position, the control method controls the internal combustion engine, the motoring structure, and the motor to motor and start the internal combustion engine with output of power from the motor for restricting rotation of the rotating shaft.

In response to a starting instruction of the internal combustion engine at the gearshift position of the gearshift lever set to the parking position, the control method of the vehicle according to this aspect of the invention controls the internal combustion engine, the motoring structure, and the motor to motor and start the internal combustion engine with output of power from the motor for restricting rotation of the rotating shaft. At the gearshift position of the gearshift lever set to the parking position, while a locking mechanism generally works to lock drive wheels, the transmission separates the rotating shaft from the axle of the vehicle to prohibit transmission of power from the rotating shaft to the axle. The transmission is designed to allow and prohibit transmission of power with a change in speed between the rotating shaft and the axle. In the case of motoring the internal combustion engine to start in this state, it is required to cancel a driving force applied to the rotating shaft by motoring of the internal combustion engine. The control method of the vehicle of this aspect of the invention controls the motor to output power to the rotating shaft for restricting rotation of the rotating shaft. The output power of the motor effectively cancels out the driving force applied to the rotating shaft by motoring of the internal combustion engine and thereby enables the internal combustion engine to be motored and started. The transmission may be constructed to have multiple clutches and designed to allow and prohibit transmission of power with a change in speed between the rotating shaft and the axle by changing coupling and releasing conditions of the multiple clutches.

Still another aspect of the invention, the present invention is directed to a control method of a vehicle. The vehicle includes: an internal combustion engine; a motoring structure connected with an output shaft of the internal combustion engine and with a rotating shaft and configured to motor the internal combustion engine with output of power to the rotating shaft; a motor configured to input and output power from and to the rotating shaft; and a transmission configured to allow and prohibit transmission of power with a change in speed between the rotating shaft and an axle of the vehicle. In response to a starting instruction of the internal combustion engine at a gearshift position of a gearshift lever set to a parking position, the control method controls the internal combustion engine, the motoring structure, and the motor to motor and start the internal combustion engine with restriction of rotation of the rotating shaft by the motor.

In response to a starting instruction of the internal combustion engine at the gearshift position of the gearshift lever set to the parking position, the control method of the vehicle according to this aspect of the invention controls the internal combustion engine, the motoring structure, and the motor to motor and start the internal combustion engine with restriction of rotation of the rotating shaft. As mentioned above, at the gearshift position of the gearshift lever set to the parking position, while the locking mechanism generally works to lock the drive wheels, the transmission separates the rotating shaft from the axle of the vehicle. In the case of motoring the internal combustion engine to start in this state, it is required to cancel a driving force applied to the rotating shaft by motoring of the internal combustion engine. The control method of the vehicle of this aspect of the invention controls the motor to restrict rotation of the rotating shaft and cancel out the driving force applied to the rotating shaft by motoring of the internal combustion engine and thereby enables the internal combustion engine to be motored and started. The transmission may be constructed to have multiple clutches and designed to allow and prohibit transmission of power with a change in speed between the rotating shaft and the axle by changing coupling and releasing conditions of the multiple clutches. The terminology 'clutch' in the specification hereof includes a brake arranged to fix one rotating system to a non-rotating system like a casing, as well as a general clutch arranged to interconnect two rotating systems.

In one preferable application of the control method of the vehicle according to this aspect of the invention, the motor has a rotor connected with the rotating shaft and a stator arranged to drive and rotate the rotor by formation of a rotating magnetic field and accordingly enable power input and power output from and to the rotating shaft. The start controller controls the motor to fix a direction of the magnetic field formed on the stator and accordingly prevent rotation of the rotor. In the control method of the vehicle of this application, fixation of the direction of the magnetic field formed on the stator effectively prevents rotation of the rotor.

BEST MODES OF CARRYING OUT THE INVENTION

Figure 1:
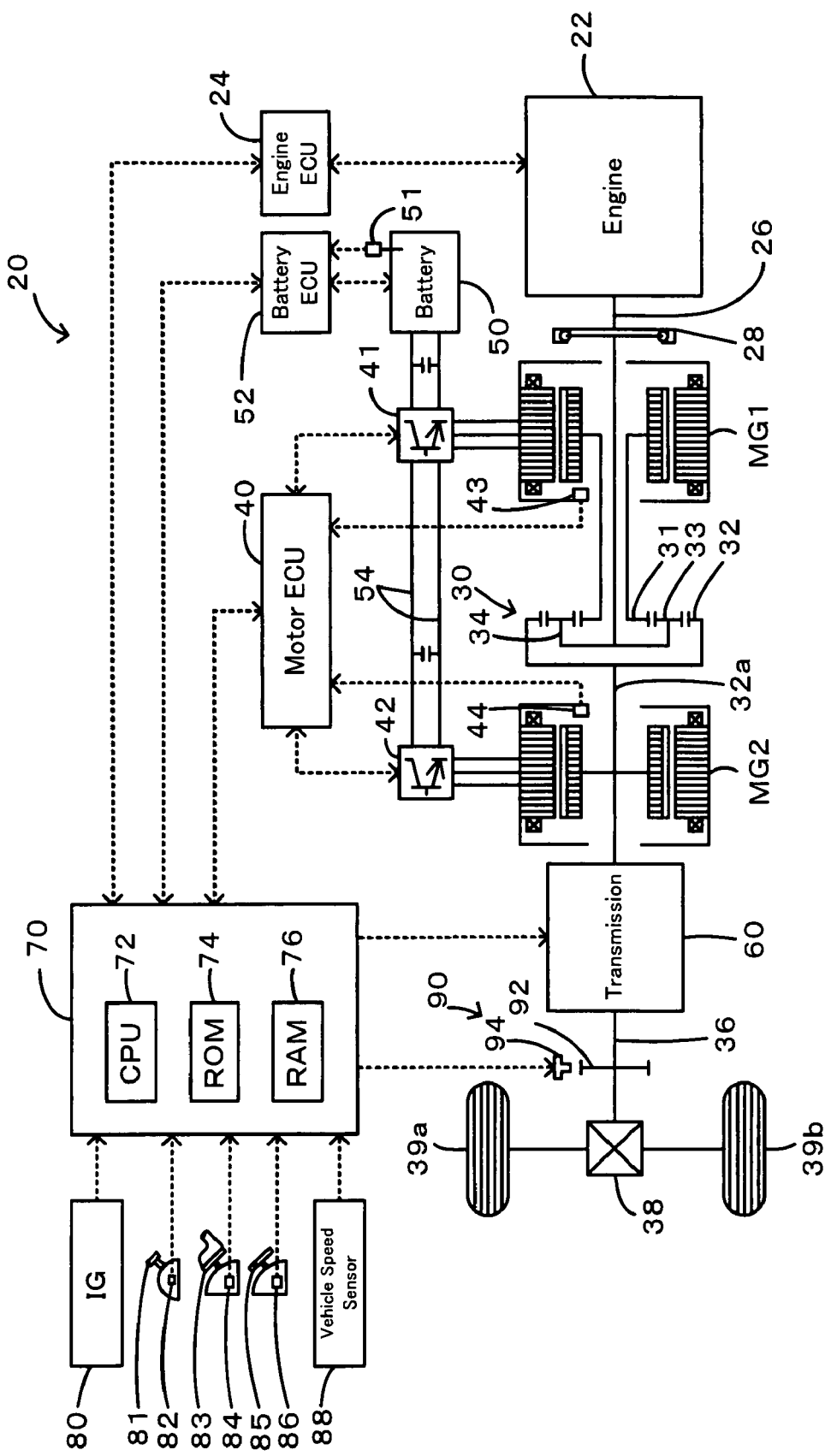
FIG. 1 schematically illustrates the configuration of a hybrid vehicle 20 in a first embodiment of the invention.

Some modes of carrying out the invention are described below as preferred embodiments with reference to the accompanied drawings. FIG. 1 schematically illustrates the configuration of a hybrid vehicle 20 in a first embodiment of the invention. As illustrated, the hybrid vehicle 20 of the embodiment includes an engine 22, a three shaft-type power distribution integration mechanism 30 connected to a crankshaft 26 or an output shaft of the engine 22 via a damper 28, a motor MG1 connected with the power distribution integration mechanism 30 and configured to enable power generation, a motor MG2 connected to a ring gear shaft 32a or a rotating shaft linked with the power distribution integration mechanism 30, a transmission 60 configured to convert the power of the ring gear shaft 32a and output the converted power to a driveshaft 36 linked with drive wheels 39a and 39b, a parking lock mechanism 90 configured to lock the drive wheels 39a and 39b, and a hybrid electronic control unit 70 configured to control the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the ring gear shaft 32a or a rotating shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the transmission 60, the driveshaft 36, and the differential gear 38.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, rotational positions θm1 and θm2 of the rotors in the motors MG1 and MG2 from rotational position detection sensors 43 and 44 that detect the rotational positions of rotors in the motors MG1 and MG2 and phase currents applied to the motors MG1 and MG2 and measured by current sensors (not shown) The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
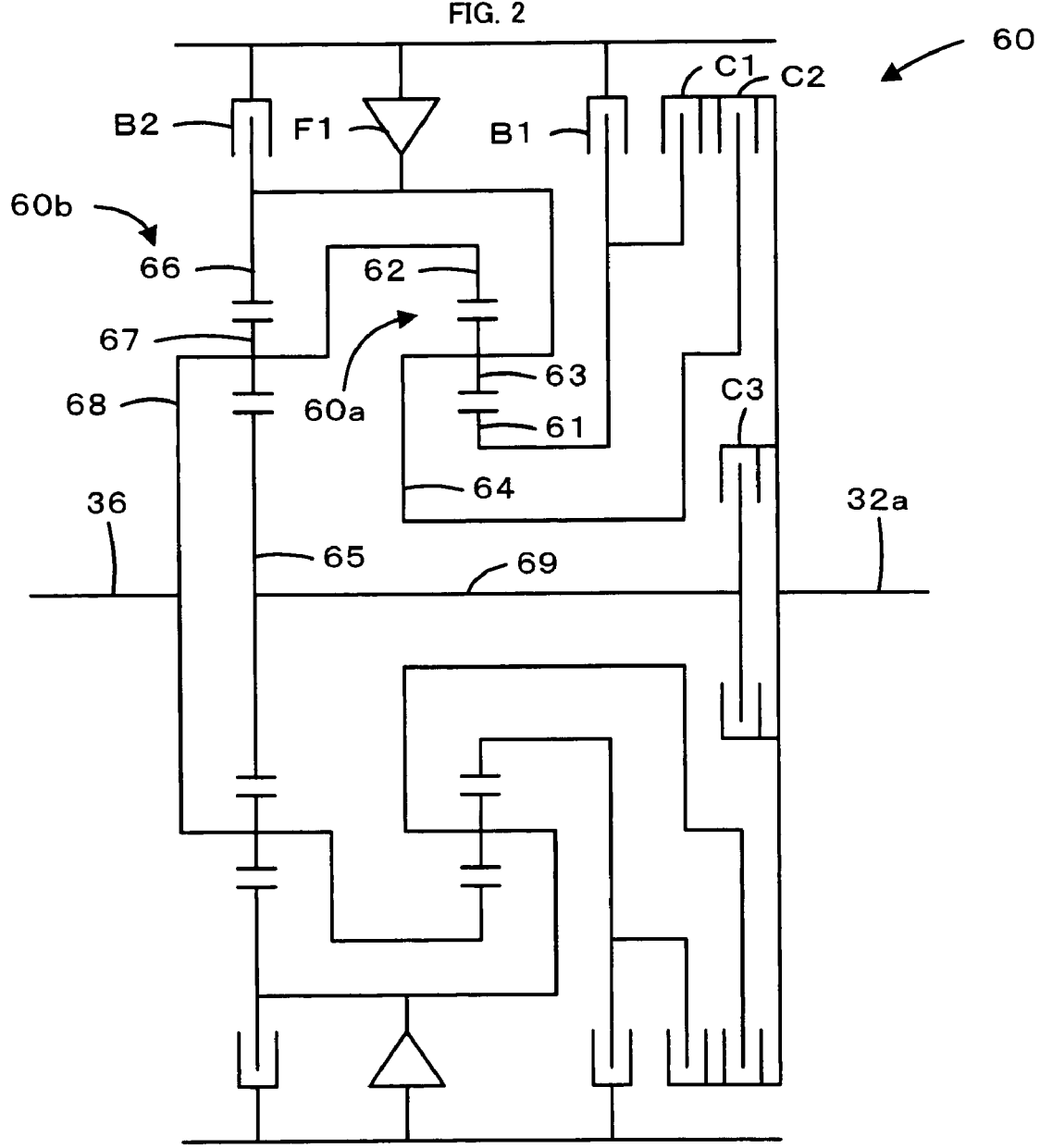
FIG. 2 schematically shows the structure of a transmission 60.

The transmission 60 is constructed to couple and decouple the ring gear shaft 32a or the rotating shaft with and from the driveshaft 36 and to change the rotation speed of the ring gear shaft 32a at four speeds in the coupled state of the two shafts and transmit the changed speed to the driveshaft 36. One example of the structure of the transmission 60 is shown in FIG. 2. The transmission 60 of FIG. 2 includes two single pinion planetary gear mechanisms 60a and 60b, three clutches C1, C2, and C3, two brakes B1 and B2, and a one-way clutch F1. The planetary gear mechanism 60a includes a sun gear 61 as an external gear, a ring gear 62 as an internal gear arranged concentrically with the sun gear 61, multiple pinion gears 63 engaging with the sun gear 61 and with the ring gear 62, and a carrier 64 holding the multiple pinion gears 63 to allow both their revolutions and their rotations on their axes. The sun gear 61 is connected with the ring gear shaft 32a via the clutch C1. Engagement and release of the brake B1 stop and allow the rotation of the sun gear 61. The carrier 64 is connected with the ring gear shaft 32a via the clutch C2. The planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 is connected with the ring gear shaft 32a via a rotating shaft 69 and the clutch C3. The ring gear 66 is connected with the carrier 64 of the planetary gear mechanism 60a. Engagement and release of the brake B2 stop and allow the rotation of the ring gear 66. The one-way clutch F1 functions to enable the free rotation of the ring gear 66 in a preset direction but prohibit the rotation of the ring gear 66 in a reverse direction opposite to the preset direction. The carrier 68 is connected with the driveshaft 36 and with the ring gear 62 of the planetary gear mechanism 60a. In the transmission 60, engagement and release of the clutches C1, C2, and C3 and the brakes B1 and B2 change the rotation speed of the ring gear shaft 32a at four different speeds and transmit the rotation with the change speed to the driveshaft 36, while separating the ring gear shaft 32a from the driveshaft 36. A hydraulic actuator (not shown) is driven to regulate hydraulic pressures applied to the clutches C1, C2, and C3 and the brakes B1 and B2 and thereby engage and release the clutches C1, C2, and C3 and the brakes B1 and B2.

The parking lock mechanism 90 includes a parking gear 92 attached to the driveshaft 36 and a parking lock pole 94 engaging with the parking gear 92 to lock the parking gear 92 in its rotation stop state. The parking lock pole 94 is activated under operation control of an actuator (not shown) by the hybrid electronic control unit 70 in response to entry of an operation signal from another gearshift position to a parking position or an operation signal from the parking position to another gearshift position. The engagement and the release of the parking lock pole 94 with and from the parking gear 92 enable and release a parking lock. The driveshaft 36 is mechanically linked with the drive wheels 39a and 39b. The parking lock mechanism 90 thus indirectly locks the drive wheels 39a and 39b.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs, for example, drive signals to the actuator (not shown) of clutches C1, C2, and C3 and the brakes B1 and B2 in the transmission 60 via the output port. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 of the embodiment, at least a parking position (P position), a neutral position (N position), a drive position (D position), and a reverse position (R position) are detectable as the gearshift position of the gearshift lever 81 by the gearshift position sensor 82. At the gearshift position of the gearshift lever 81 set to the parking position, the clutches C1, C2, and C3 and the brakes B1 and B2 in the transmission 60 are all released to separate the ring gear shaft 32a from the driveshaft 36.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
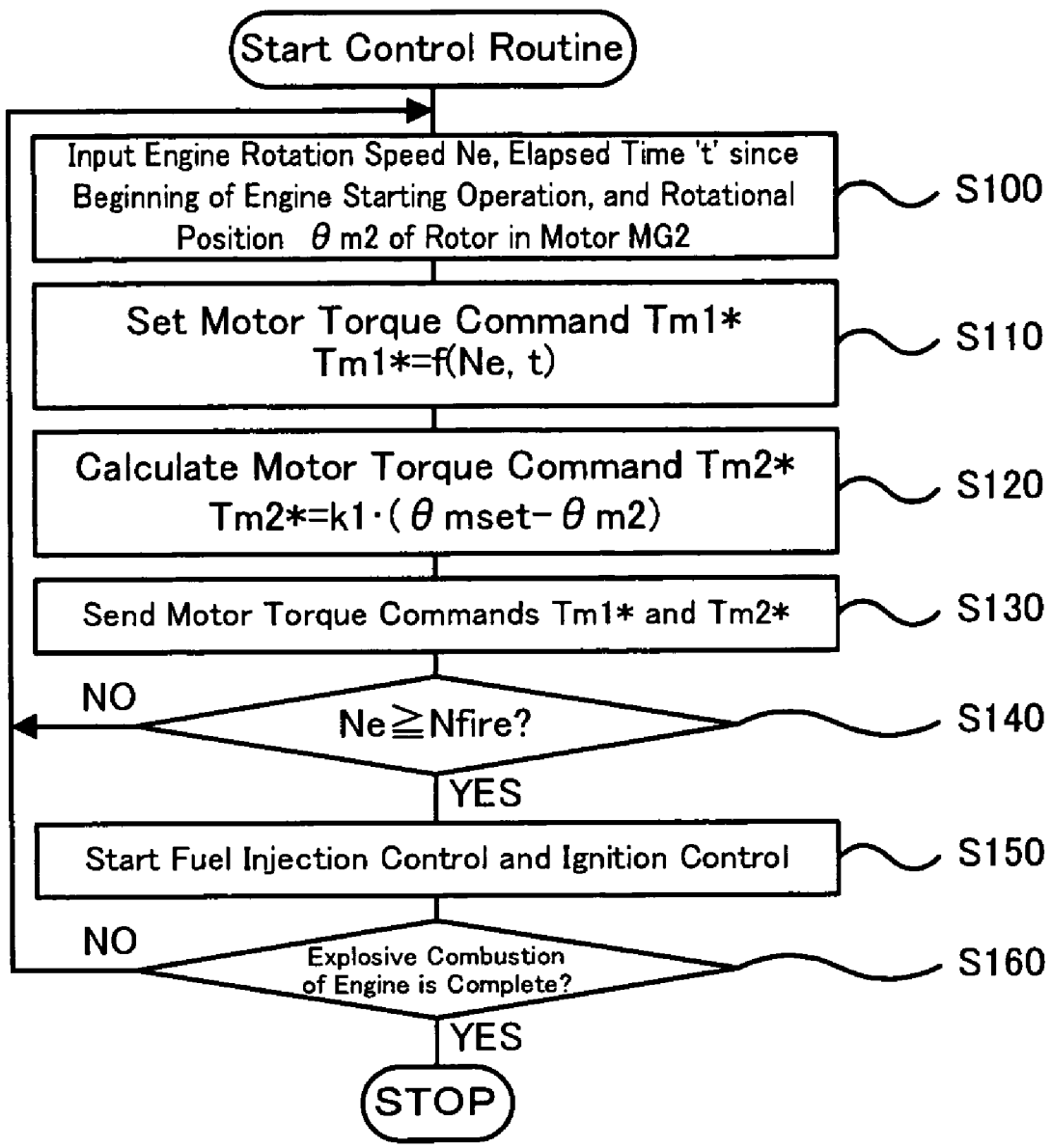
FIG. 3 is a flowchart showing a start control routine executed by a hybrid electronic control unit 70 in the first embodiment.

The description regards the operations of the hybrid vehicle 20 of the embodiment having the configuration discussed above, especially a series of operation control to start the engine 22 at the time of system activation. FIG. 3 is a flowchart showing a start control routine executed by the hybrid electronic control unit 70. The start control routine is triggered by a starting instruction of the engine 22 at the time of system activation of the hybrid vehicle 20. At the time of system activation, the gearshift lever 81 is generally kept at the parking position. As mentioned previously, while the parking lock mechanism 90 locks the drive wheels 39a and 39b, the transmission 60 separates the ring gear shaft 32a or the rotating shaft from the driveshaft 36.

In the start control routine, the CPU 72 of the hybrid electronic control unit 70 first inputs a rotation speed Ne of the engine 22, an elapsed time 't' since the beginning of a starting operation of the engine 22, and a rotational position $\theta m2$ of a rotor in the motor MG2 (step S100). The rotation speed Ne of the engine 22 is computed from a signal output from a crank position sensor (not shown) attached to the crankshaft 26 and is input from the engine ECU 24 by communication. The elapsed time 't' since the beginning of the engine starting operation is counted by a timer (not shown) and is input as a time period elapsed since a start of this start control routine. The rotational position $\theta m2$ of the rotor in the motor MG2 is detected by the rotational position detection sensor 44 and is input from the motor ECU 40 by communication.

Figure 4:
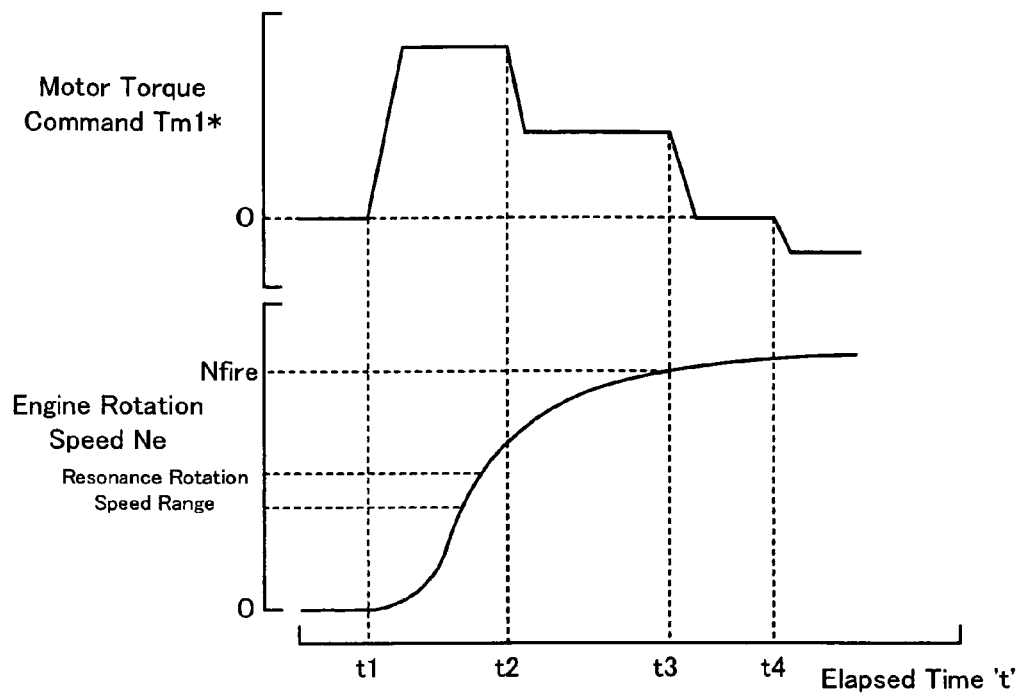
FIG. 4 shows one example of a torque command setting map.

After the data input, the CPU 72 sets a torque command Tm1* of the motor MG1 corresponding to the input rotation speed Ne of the engine 22 and the input elapsed time 't' since the beginning of the starting operation of the engine 22 (step S110). A concrete procedure of setting the torque command Tm1* of the motor MG1 in this embodiment provides and stores in advance a variation in torque command Tm1* of the motor MG1 against the rotation speed Ne of the engine 22 and the elapsed time 't' since the beginning of the starting operation of the engine 22 as a torque command setting map and reads the torque command Tm1* of the motor MG1 corresponding to the given rotation speed Ne of the engine 22 and the given elapsed time 't' since the beginning of the starting operation of the engine 22 from the stored torque command setting map. One example of the torque command setting map is shown in FIG. 4. In the torque command setting map of FIG. 4, immediately after a time point t1 when the starting instruction of the engine 22 is given, the rating process is performed to promptly increase the torque command Tm1* to a relatively large torque and thereby quickly increase the rotation speed Ne of the engine 22. At a time point t2 after the rotation speed Ne of the engine 22 has passed through a resonance rotation speed range or after a required time period for allowing the rotation speed Ne of the engine 22 to pass through the resonance rotation speed range has elapsed since the time point t1, a sufficient torque for stably motoring the engine 22 at a rotation speed of not lower than an ignition start rotation speed Nfire is set to the torque command Tm1*, in order to reduce the power consumption and the reactive torque at the ring gear shaft 32a or the driveshaft. In this embodiment, the ignition start rotation speed Nfire is to be sufficiently higher than the resonance rotation speed range and is set equal to, for example, 1000 rpm or 1200 rpm. At a time point t3 when the rotation speed Ne of the engine 22 has reached the ignition start rotation speed Nfire, the rating process is performed to promptly decrease the torque command Tm1* to 0. At a time point t4 when complete explosive consumption of the engine 22 is identified, the control of the torque command Tm1* is terminated. By setting a large torque to the torque command Tm1* of the motor MG1 immediately after the starting instruction of the engine 22 to start motoring the engine 22, the rotation speed of the engine 22 promptly increases to or above the ignition start rotation speed Nfire to start the engine 22.

The CPU 72 subsequently calculates a torque command Tm2* of the motor MG2 from the current rotational position $\theta m2$ of the rotor in the motor MG2 and a preset reference position $\theta mset$ according to Equation (1) given below (step S120):

$$Tm2^* = k1 \cdot (\theta mset - \theta m2) \qquad (1)$$

Figure 5:
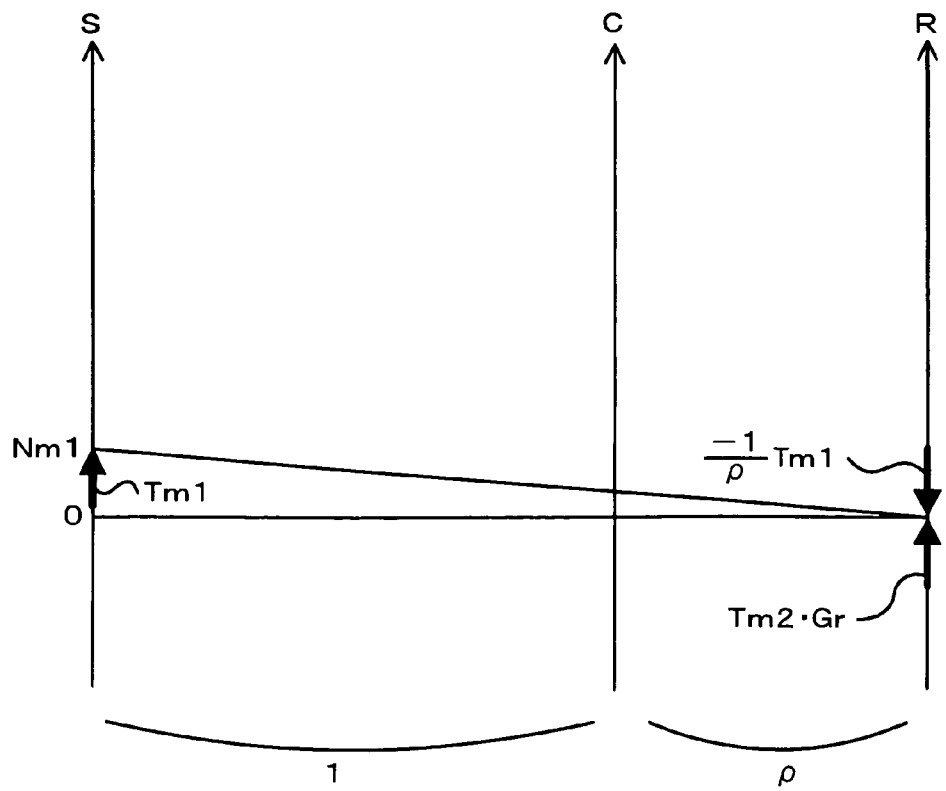
FIG. 5 is an alignment chart showing torque-rotation speed dynamics of rotational elements included in a power distribution integration mechanism 30 in the state of motoring an engine 22.

The preset reference position $\theta mset$ may be a rotational position of the rotor in the motor MG2 on the start of this start control routine or at the start of motoring the engine 22. Equation (1) is a relational expression of feedback control to cancel out a difference between the current rotational position $\theta m2$ of the rotor in the motor MG2 and the preset reference position $\theta mset$. In Equation (1), 'k1' on the right side represents a gain of a proportional term. Setting the torque command Tm2* of the motor MG2 in this manner controls the motor MG2 to cancel out the difference between the current rotational position $\theta m2$ of the rotor in the motor MG2 and the preset reference position $\theta mset$, that is, to cancel out the difference between a rotational position $\theta r$ of the ring gear shaft 32a corresponding to the rotational position $\theta m2$ and a preset position $\theta rset$ of the ring gear shaft 32a corresponding to the preset reference position $\theta mset$. Such control of the motor MG2 effectively prevents the rotational position $\theta r$ of the ring gear shaft 32a from being significantly deviated from the preset position $\theta rset$. The alignment chart of FIG. 5 shows torque-rotation speed dynamics of the rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents a rotation speed Nr of the ring gear 32 obtained by dividing the rotation speed Nm2 of the motor MG2 by a gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a by output of the torque Tm2 from the motor MG2. At the gearshift position of the gearshift lever 81 set to the parking position, while the parking lock mechanism 90 locks the drive wheels 39a and 39b, the transmission 60 separates the ring gear shaft 32a or the rotating shaft from the driveshaft 36. At the time of motoring the engine 22 to start by means of the motor MG1, without cancellation of the torque output from the motor MG1 and applied to the ring gear shaft 32a, the ring gear shaft 32a is undesirably rotated to interfere with motoring the engine 22. The procedure of this embodiment sets the torque command Tm2* of the motor MG2 to cancel out the difference between the rotational position θm2 of the rotor in the motor MG2 and the preset reference position θmset. Such setting causes the torque output from the motor MG1 and applied to the ring gear shaft 32a at the time of motoring the engine 22 by the motor MG1 to be cancelled by the output torque of the motor MG2, thus enabling the engine 22 to be smoothly motored by the motor MG1.

After setting the torque commands Tm1* and Tm2* of the motors MG1 and MG2, the CPU 72 sends the set torque commands Tm1* and Tm2* to the motor ECU 40 (step S130). The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

After sending the torque commands Tm1* and Tm2*, the CPU 72 determines whether the rotation speed Ne of the engine 22 has reached the ignition start rotation speed Nfire (step S140). When the rotation speed Ne of the engine 22 has not yet reached the ignition start rotation speed Nfire, the start control routine goes back to step S100. When the rotation speed Ne of the engine 22 has reached the ignition start rotation speed Nfire by motoring the engine 22 (step S140: yes), the CPU 72 starts fuel injection control and ignition control via the engine ECU 24 (step S150) and identifies complete or incomplete explosive combustion of the engine 22 (step S160). Upon identification of incomplete explosive combustion of the engine 22, the start control routine goes back to step S100. Upon identification of complete explosive combustion of the engine 22, the start control routine is terminated.

As described above, in response to a starting instruction of the engine 22 at the gearshift position of the gearshift lever 81 set to the parking position, the hybrid vehicle 20 of the embodiment controls the operations of the engine 22 and the motors MG1 and MG2 to motor and start the engine 22 with output of a torque from the motor MG2 for restricting the rotation of the ring gear shaft 32a or the rotating shaft. Such control enables the engine 22 to be motored and started even at the gearshift position of the gearshift lever 81 set to the parking position.

In the above description of the embodiment, in response to a starting instruction of the engine 22 at the time of system activation, the engine 22 is motored to start with output of the torque from the motor MG2 for restricting the rotation of the ring gear shaft 32a or the rotating shaft. Such torque control is, however, not restrictively performed at the time of system activation. In response to a starting instruction of the engine 22 at the gearshift position of the gearshift lever 81 set to the parking position, the engine 22 may be motored to start with output of the torque from the motor MG2 for restricting the rotation of the ring gear shaft 32a or the rotating shaft.

The hybrid vehicle 20 of the embodiment calculates the torque command Tm2* of the motor MG2 according to the relational expression of the proportional feedback control. The torque command Tm2* of the motor MG2 may be calculated according to a relational expression of integral control or differential control in addition to the proportional control. The hybrid vehicle 20 of the embodiment uses only the relational expression of the proportional feedback control to calculate the torque command Tm2* of the motor MG2. One modification may set the torque command Tm2* of the motor MG2 by additionally taking into account a torque balancing with the torque output from the motor MG1 and applied to the ring gear shaft 32a according to Equation (2) given below:

$$Tm2^* = Tm1^*/\rho + k2 \cdot (\theta mset - \theta m2) \quad (2)$$

In Equation (2), 'k2' in the second term on the right side represents a gain of a proportional term.

In response to a starting instruction of the engine 22 at the gearshift position of the gearshift lever 81 set to the parking position, the hybrid vehicle 20 of the embodiment calculates the torque command Tm2* of the motor MG2 to cancel out the difference between the rotational position θm2 of the rotor in the motor MG2 and the preset reference position θmset. The torque command Tm2* of the motor MG2 may be calculated according to Equation (3) given below as a relational expression of feedback control to make a rotation speed Nm2 of the motor MG2 approximately equal to 0:

$$Tm2^* = k3 \cdot (0 - Nm2) \quad (3)$$

The rotation speed Nm2 of the motor MG2 is calculated from the rotational position of the rotor in the motor MG2 detected by the rotational position detection sensor 44 and is input from the motor ECU 40 by communication. In Equation (3), 'k3' on the right side represents a gain of a proportional term.

In response to a starting instruction of the engine 22 at the gearshift position of the gearshift lever 81 set to the parking position, the hybrid vehicle 20 of the embodiment sets the torque command Tm2* of the motor MG2 to cancel out the difference between the rotational position θm2 of the rotor in the motor MG2 and the preset reference position θmset and controls the motor MG2 to output the set torque command Tm2*. The rotation of the ring gear shaft 32a or the rotating shaft may alternatively be restricted by fixing the direction of the magnetic field on the stator of the motor MG2. This is explained below as a second embodiment.

Figure 6:
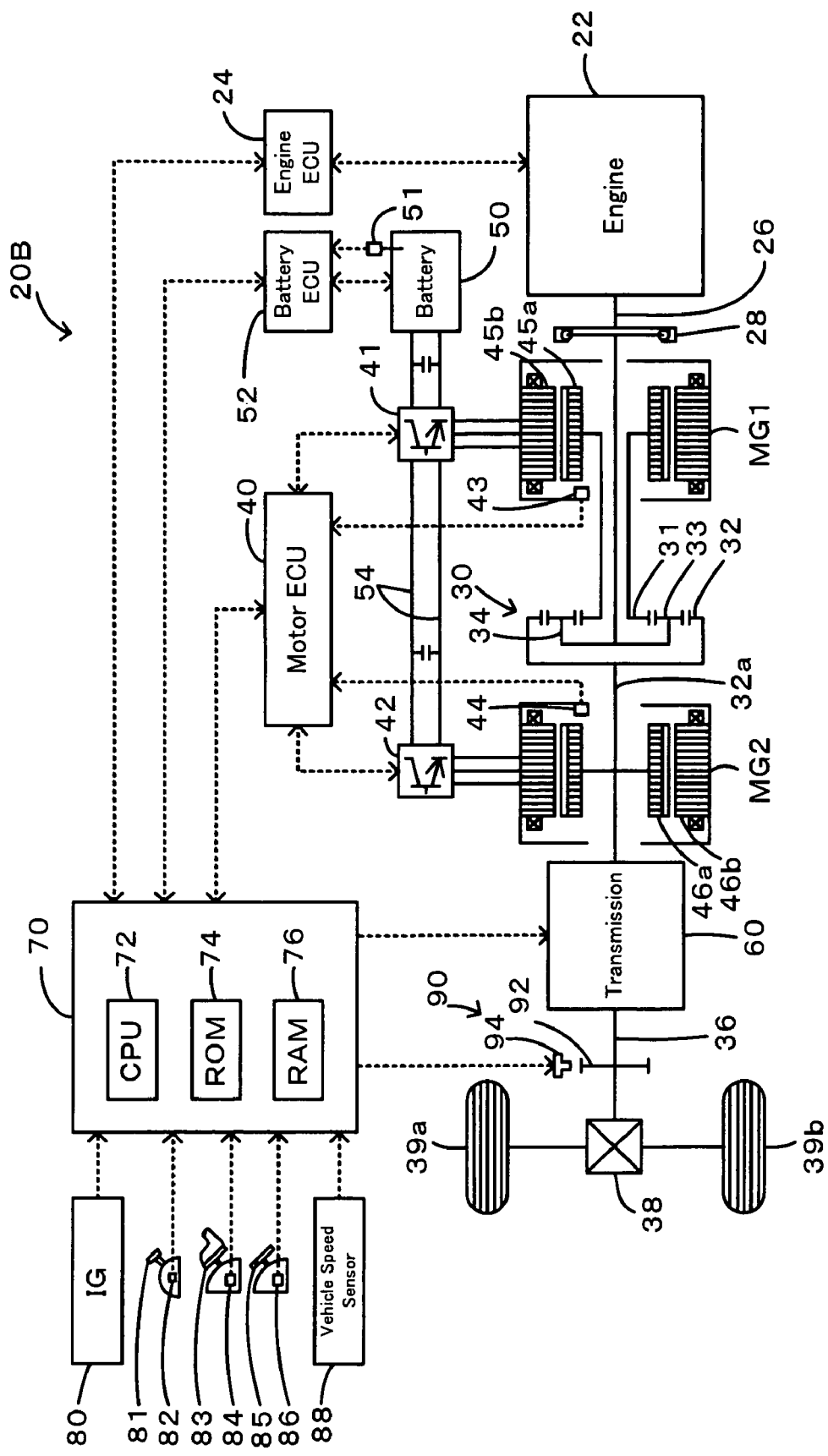
FIG. 6 schematically illustrates the configuration of a hybrid vehicle 20B in a second embodiment of the invention.
Figure 7:
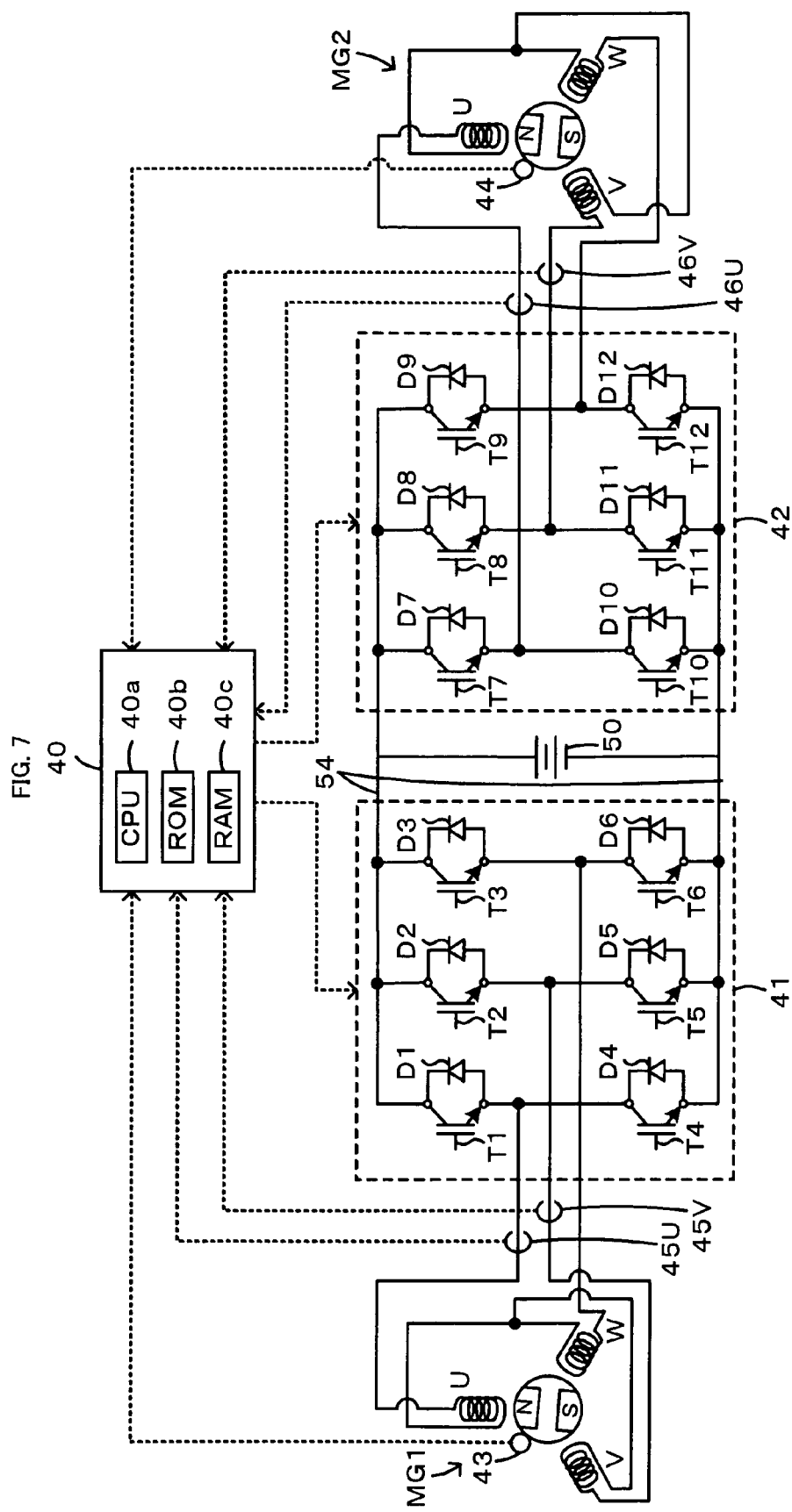
FIG. 7 schematically shows the structure of an electric driving system including motors MG1 and MG2 and inverters 41 and 42.

FIG. 6 schematically illustrates the configuration of a hybrid vehicle 20B in the second embodiment of the invention. FIG. 7 schematically shows the structure of an electric driving system including motors MG1 and MG2 and inverters 41 and 42. In the hybrid vehicle 20B of the second embodiment, symbols 45a and 45b are respectively allocated to a rotor and a stator of the motor MG1, while symbols 46a and 46b are respectively allocated to a rotor and a stator of the motor MG2 as shown in FIG. 6. Despite such symbolic expression of FIG. 6 and illustration of the schematic structure of the electric driving system of FIG. 7, the hybrid vehicle 20B of the second embodiment has the same hardware configuration as that of the hybrid vehicle 20 of the embodiment shown in FIG. 1. In order to avoid duplication of the explanation, the respective hardware elements in the hybrid vehicle 20B of the second embodiment except those with the newly allocated symbols and those newly illustrated are expressed by the like numerals and symbols to those allocated to the hardware elements in the hybrid vehicle 20 of the first embodiment and are not specifically explained here.

As shown in FIGS. 6 and 7, the motor MG1 has the rotor 45a with permanent magnets attached thereto and the stator 45b with three-phase coils wound thereon. Similarly the motor MG2 has the rotor 46a with permanent magnets attached thereto and the stator 46b with the three-phase coils wound thereon. The inverter 41 has six transistors T1 to T6 and six diodes D1 to D6, and the inverter 42 has six transistors T7 to T12 and six diodes D7 to D12. The six transistors T1 to T6 or T7 to T12 are arranged in pairs, so that two transistors in each pair respectively work as a source and a sink to a positive bus and to a negative bus of the power line 54. The three-phase coils (U phase, V phase, and W phase) of the motor MG1 and of the motor MG2 are respectively connected to connection points of the corresponding three pairs of the transistors. The six diodes D1 to D6 or D7 to D12 have back-to-back connection to the corresponding six transistors T1 to T6 or T7 to T12. Controlling the rate of the ON time of the transistors T1 to T6 or T7 to T12 arranged in pairs with application of a voltage between the positive bus and the negative bus of the power line 54 forms a rotating magnetic field on the three-phase coils to rotate and drive the motor MG1 or the motor MG2. The motor ECU 40 is constructed as a microprocessor including a CPU 40a, a ROM 40b configured to store processing programs, a RAM 40c configured to temporarily store data, input and output ports (not shown), and a communication port (not shown). The motor ECU 40 inputs required signals for controlling the operations of the motors MG1 and MG2, for example, rotational positions θm1 and θm2 of the rotors 45a and 46a in the motors MG1 and MG2 from the rotational position detection sensors 43 and 44 and phase currents Iu1, Iv1, Iu2, and Iv2 flowing through the U phases and the V phases of the three-phase coils in the motors MG1 and MG2 from current sensors 45U, 45V, 46U, and 46V. The motor ECU 40 outputs switching control signals to the transistors T1 to T6 in the inverter 41 and to the transistors T7 to T12 in the inverter 42.

Figure 8:
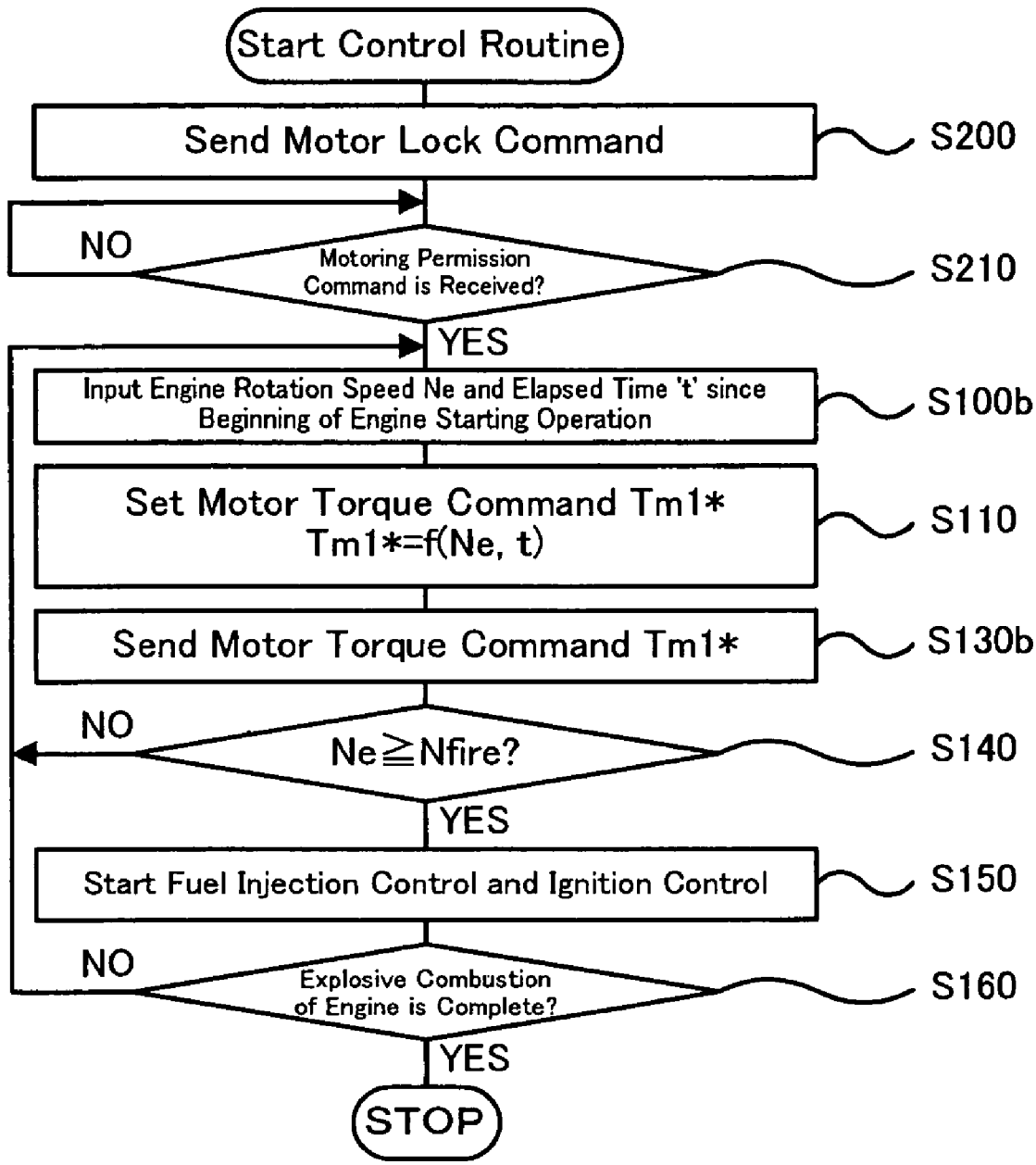
FIG. 8 is a flowchart showing a start control routine executed by the hybrid electronic control unit 70 in the second embodiment.

The hybrid vehicle 20B of the second embodiment executes a start control routine shown in the flowchart of FIG. 8, in place of the start control routine of FIG. 3. In the start control routine of FIG. 8, the CPU 72 of the hybrid electronic control unit 70 first sends a motor lock command to the motor ECU 40 (step S200) and waits to receive a motoring permission command from the motor ECU 40 (step S210). In response to reception of the motor lock command, the motor ECU 40 executes a motor lock command reception-time second motor control routine shown in the flowchart of FIG. 9 to fix the direction of the magnetic field on the stator 46b of the motor MG2 and accordingly prevent rotation of the rotor 46a of the motor MG2 (that is, rotation of the ring gear shaft 32a). The motoring permission command is sent from the motor ECU 40 to the hybrid electronic control unit 70 upon permission for the motor MG1 to start motoring the engine 22 according to the motor lock command reception-time second motor control routine of FIG. 9. The details of the motor lock command reception-time second motor control routine of FIG. 9 will be explained later.

The CPU 72 subsequently inputs a rotation speed Ne of the engine 22 and an elapsed time 't' since the beginning of a starting operation of the engine 22 (step S100b), sets the torque command Tm1* of the motor MG1 corresponding to the input rotation speed Ne of the engine 22 and the input elapsed time 't' since the beginning of the starting operation of the engine 22 by referring to the torque command setting map of FIG. 4 (step S110), and sends the set torque command Tm1* of the motor MG1 (step S130b). The start control routine starts the fuel injection control and the ignition control when the rotation speed Ne of the engine 22 has reached the ignition start rotation speed Nfire (steps S140 and S150) and waits for the complete explosive combustion of the engine 22 (step S160). The rotation speed Ne of the engine 22 is input in the same manner as explained above with regard to the start control routine of FIG. 3. A time period since the start of motoring the engine 22 is input as the elapsed time 't' since the beginning of the starting operation of the engine 22 in the start control routine of FIG. 8. In the second embodiment, in response to reception of the torque command Tm1*, the motor ECU 40 executes a first motor control routine (not shown) to control the motor MG1 to be driven with the torque command Tm1*.

Figure 9:
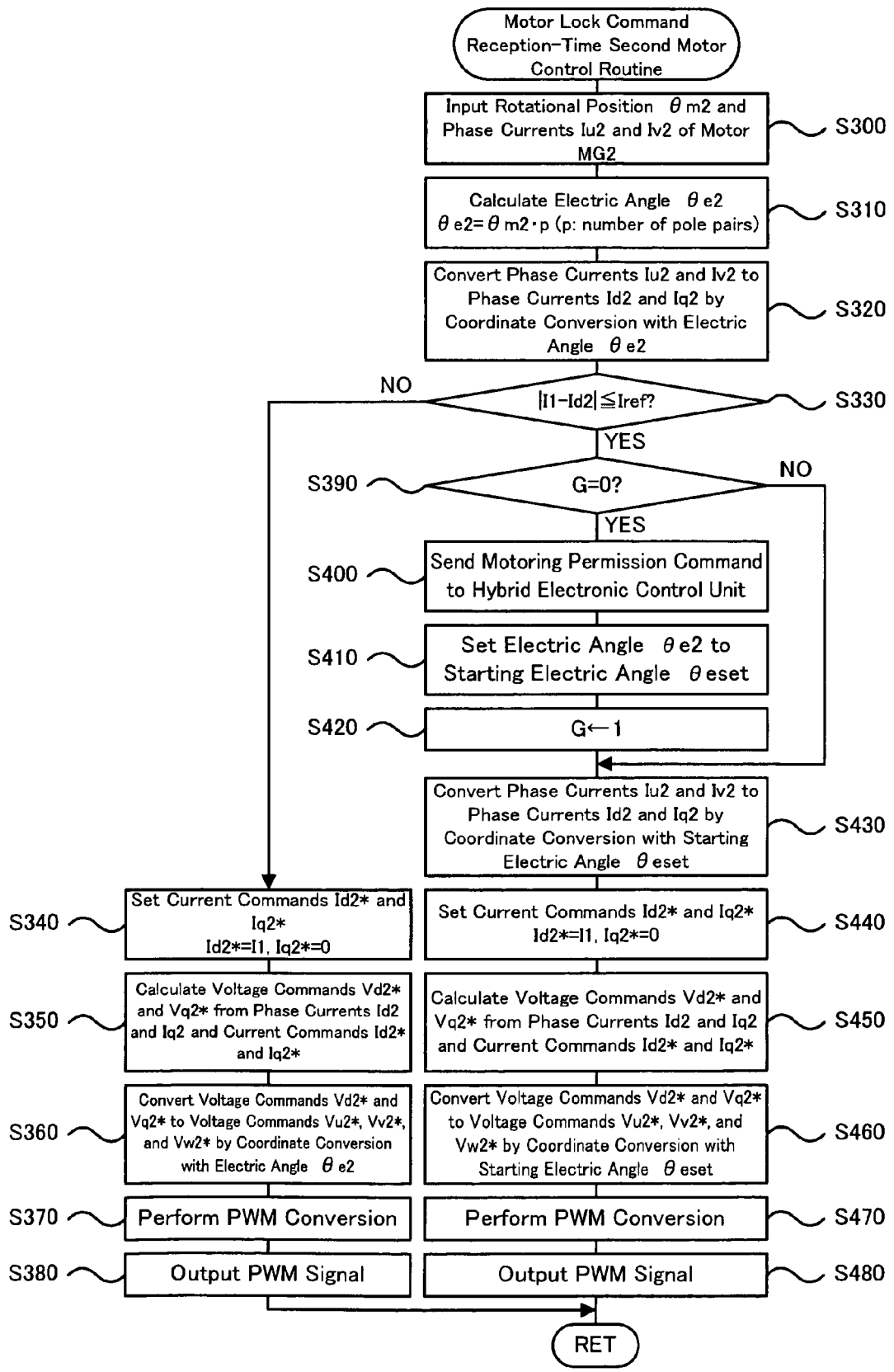
FIG. 9 is a flowchart showing a second motor control routine at reception of a motor lock command executed by a motor ECU 40 in the second embodiment.

The description regards the motor lock command reception-time second motor control routine shown in FIG. 9. This routine is performed repeatedly at preset time intervals (for example, at every several msec) after reception of the motor lock command from the hybrid electronic control unit 70. In the motor lock command reception-time second motor control routine of FIG. 9, the CPU 40a of the motor ECU 40 first inputs the rotational position θm2 of the rotor 46a in the motor MG2 from the rotational position detection sensor 44 and the phase currents Iu2 and Iv2 flowing through the U phase and the V phase of the three-phase coils from the current sensors 46U and 46V (step S300), and multiplies the input rotational position θm2 of the rotor 46a in the motor MG2 by a number of pole pairs 'p' to calculate an electric angle θe2 (step S310). The input phase currents Iu2 and Iv2 are converted to electric currents Id2 and Iq2 on an axis 'd' and an axis 'q' by coordinate conversion (three phase-to-two phase conversion) according to Equation (4) given below with the electric angle θe2 upon assumption that the sum of the phase currents Iu2, Iv2, and Iw2 flowing through the U phase, the V phase, and the W phase of the three-phase coils in the motor MG2 is equal to 0 (step S320):

$$\begin{bmatrix} Id2 \\ Iq2 \end{bmatrix} = \sqrt{2} \begin{bmatrix} \sin(\theta e2 + \frac{\pi}{3}) & \sin(\theta e2) \\ \cos(\theta e2 + \frac{\pi}{3}) & \cos(\theta e2) \end{bmatrix} \begin{bmatrix} Iu2 \\ Iv2 \end{bmatrix} \quad (4)$$

In a d-q coordinate system, the axis 'd' represents the direction of a magnetic flux formed by the permanent magnets attached to the rotor 46a, and the axis 'q' represents the direction advanced relative to the axis 'd' by an electric angle of π/2.

Figure 10:
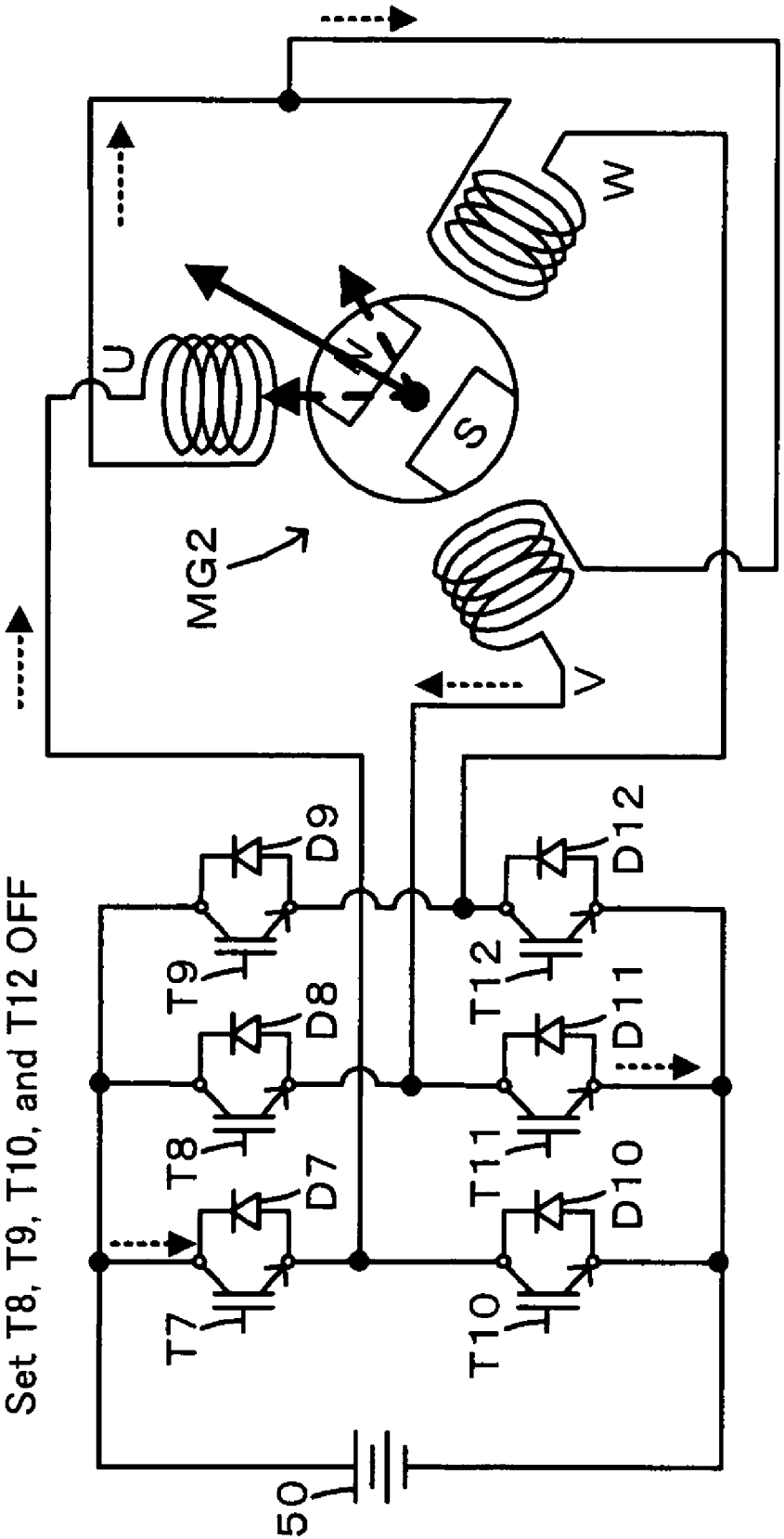
FIG. 10 shows fixation of the direction of a magnetic field generated on a stator 46b of the motor MG2 to prevent rotation of a rotor 46a of the motor MG2 (ring gear shaft 32a as a rotating shaft)

A difference between a preset electric current I1 and the electric current Id2 on the axis 'd' is compared with a predetermined reference value Iref (step S330). The electric current I1 may be set, for example, to a value of electric current to be flowed in the axis 'd' in the d-q coordinate system at a starting electric angle θeset under application of direct currents to the three-phase coils of the motor MG2 to prevent rotation of the rotor 46a in the motor MG2. The starting electric angle θeset represents a value of the electric angle θe2 used to fix the direction of the magnetic field on the stator 46b of the motor MG2 and accordingly prevent rotation of the rotor 46a in the motor MG2. The starting electric angle θeset will be discussed in detail later. FIG. 10 shows fixation of the direction of the magnetic field generated on the stator 46b of the motor MG2 to prevent rotation of the rotor 46a of the motor MG2 (that is, rotation of the ring gear shaft 32a as the rotating shaft). In the illustrated example of FIG. 10, in response to application of direct currents to the U phase and the V phase, a fixed magnetic field (shown by a solid-line arrow) is generated on the stator 46b as a composition of two magnetic fields (shown by broken-line arrows) respectively formed on the two phases with application of the direct currents. When the direction of the fixed magnetic field is identical with the direction of the magnetic flux formed by the permanent magnets on the rotor 46a of the motor MG2, that is, when the direction of the fixed magnetic field is identical with the direction of the axis 'd' in the d-q coordinate system, no torque is output from the motor MG2 to the ring gear shaft 32a. In the course of motoring the engine 22, the torque output from the motor MG1 and applied to the ring gear shaft 32a (this torque is referred to as 'application torque' in the following description) may rotate the rotor 46a of the motor MG2 and deviate the direction of the fixed magnetic field generated on the stator 46b from the direction of the axis 'd' in the d-q coordinate system. In this case, a torque is applied to the rotor 46a (this torque is referred to as attraction torque in the following description) according to the direction of the fixed magnetic field generated on the stator 46b and the electric angle θe2 of the motor MG2, in order to make the direction of the fixed magnetic field identical with the direction of the axis 'd'. The rotor 46a stops at a position of balancing the application torque with the attraction torque. The start control routine of the second embodiment sets the torque command Tm1* of the motor MG1 in the same manner as the start control routine of the first embodiment. Such setting causes the application torque to vary according to the rotation speed Ne of the engine 22 and the elapsed time 't' since the beginning of the starting operation of the engine 22. The application torque accordingly balances with the attraction torque at the corresponding electric angle θe2. The electric current I1 is set to a fixed value of not less than a value of electric current required to prevent rotation of the rotor 46a of the motor MG2 even under application of a maximum torque to the ring gear shaft 32a. The maximum torque represents a maximum possible torque output from the motor MG1 and applied to the ring gear shaft 32a in the course of motoring the engine 22 by means of the motor MG1. The reference value Iref is used as a criterion of determining whether the electric current Id2 on the axis 'd' becomes sufficiently close to the preset electric current I1. The reference value Iref is determined according to the characteristics of the motor MG2 and the inverter 42. The determination of whether the electric current Id2 on the axis 'd' becomes sufficiently close to the preset electric current I1 is performed since some time is required for approach of the electric current Id2 on the axis 'd' to the preset electric current I1 by a smoothing operation. The smoothing operation prevents the electric current Id2 on the axis 'd' from significantly exceeding the preset electric current I1, as the electric current Id2 on the axis 'd' increases from 0 to the preset electric current I1. The comparison of the difference between the preset electric current I1 and the electric current Id2 on the axis 'd' with the predetermined reference value Iref at step S330 determines whether the electric current applied to the motor MG2 is sufficient for preventing rotation of the rotor 46a of the motor MG2.

Upon determination that the difference between the electric current Id2 on the axis 'd' and the preset electric current I1 is greater than the predetermined reference value Iref at step S330, that is, when the electric current Id2 on the axis 'd' has not yet sufficiently approached to the preset electric current I1, it is determined that the electric current required to prevent rotation of the rotor 46a of the motor MG2 has not yet been applied to the motor MG2. The CPU 40a then sets an electric current command Id2* to the preset electric current I1 and an electric current command Iq2* to 0, in order to enable the electric current to flow only the axis 'd' in the d-q coordinate system (step S340) and calculates voltage commands Vd2* and Vq2* of the axis 'd' and the axis 'q' in the motor MG2 from the set electric current commands Id2* and Iq2* and the phase currents Id2 and Iv2 according to Equations (5) and (6) given below (step S350):

$$Vd2^* = k3(Id2^* - Id2) + \Sigma k4(Id2^* - Id2) \quad (5)$$

$$Vq2^* = k5(Iq2^* - Iq2) + \Sigma k6(Iq2^* - Iq2) \quad (6)$$

In Equations (5) and (6), 'k3' and 'k5' represent proportionality coefficients, and 'k4' and 'k6' represent integral coefficients.

The voltage commands Vd2* and Vq2* of the axis 'd' and the axis 'q' are converted to voltage commands Vu2*, Vv2*, and Vw2* to be applied to the U phase, the V phase, and the W phase of the three-phase coils in the motor MG2 by coordinate conversion (two phase-to-three phase conversion) according to Equations (7) and (8) given below (step S360):

$$\begin{bmatrix} Vu2^* \\ Vv2^* \end{bmatrix} = \sqrt{\frac{2}{3}} \begin{bmatrix} \cos(\theta e2) & -\sin(\theta e2) \\ \cos\left(\theta e2 - \frac{2\pi}{3}\right) & -\sin\left(\theta e2 - \frac{2\pi}{3}\right) \end{bmatrix} \begin{bmatrix} Vd2^* \\ Vq2^* \end{bmatrix} \quad (7)$$

$$Vw2^* = -Vu2^* - Vv2^* \quad (8)$$

The CPU 40a converts the voltage commands Vu2*, Vv2*, and Vw2* after the coordinate conversion into a PWM signal for switching the inverter 42 (step S370), and outputs the converted PWM signal to the inverter 42 to control the operations of the motor MG2 (step S380). The motor lock command reception-time second motor control routine is then terminated. The electric current is flowed only through the axis 'd in the d-q coordinate system at the electric angle θe2 corresponding to the rotational position θm2 of the rotor 46a in the motor MG2 detected by the rotational position detection sensor 44. The motor MG2 accordingly has no torque input or torque output from and to the ring gear shaft 32a. Namely the ring gear shaft 32a is kept free.

Upon determination that the difference between the electric current Id2 on the axis 'd' and the preset electric current I1 is not greater than the predetermined reference value Iref at step S330, that is, when the electric current Id2 on the axis 'd' has sufficiently approached to the preset electric current I1, it is determined that the electric current required to prevent rotation of the rotor 46a of the motor MG2 has been applied to the motor MG2. In this case, the CPU 40a identifies the value of a flag G (step S390). The flag G is set to 0 as an initial value. Upon identification of the flag G equal to 0 at step S390, the CPU 40a sends the motoring permission command to the hybrid electronic control unit 70 (step S400), sets the electric angle θe2 to the starting electric angle θeset (step S410), and sets the flag G to 1 (step S420). Upon identification of the flag G equal to 1 at step S390, on the other hand, the processing of steps S400 to S420 is skipped. The processing of steps S390 to S420 sends the motoring permission command to the hybrid electronic control unit 70 and sets the electric angle θe2 to the starting electric angle θeset immediately after the approach of the electric current Id2 on the axis 'd' to the preset electric current I1. The motoring permission command is sent to the hybrid electronic control unit 70 at step S400 when the electric current Id2 on the axis 'd' has approached to the preset electric current I1, because of the following reason. When the motor MG1 starts motoring the engine 22 prior to the sufficient approach of the electric current Id2 on the axis 'd' to the preset electric current I1, failed application of the electric current required for preventing rotation of the rotor 46a in the motor MG2 relative to the application torque causes the rotor 46a of the motor MG2 to be rotated. When the motor MG1 starts motoring the engine 22 after the sufficient approach of the electric current Id2 on the axis 'd' to the preset electric current I1, on the other hand, motoring the engine 22 is performable with preventing rotation of the rotor 46a in the motor MG2. Because of this reason, the motoring permission command is sent to the hybrid electronic control unit 70 upon the sufficient approach of the electric current Id2 on the axis 'd' to the preset electric current I1. The hybrid electronic control unit 70 starts motoring the engine 22 in response to reception of the motoring permission command as explained previously. The starting electric angle θeset is set equal to the electric angle θe2 when the electric current Id2 on the axis 'd' has approached to the preset electric current I1 at step S410, because of the following reason. Setting the starting electric angle θeset equal to the electric angle θe2 before the electric current Id2 on the axis 'd' has approached to the preset electric current I1 may rotate the rotor 46a of the motor MG2 prior to the approach of the electric current Id2 on the axis 'd' to the preset electric current I1 to increase a deviation of the electric angle θe2 from the starting electric angle θeset. The large deviation may increase a rotational angle of the rotor 46a of the motor MG2 to the electric angle θe2 at which the application torque balances with the attraction torque in the condition of generation of the fixed magnetic field on the stator 46b at the starting electric angle θeset upon the approach of the electric current Id2 on the axis 'd' to the preset electric current I1. The increased rotational angle may lead to vibration of the rotor 46a around the electric angle θe2 at which the application torque balances with the attraction torque. Setting the starting electric angle θeset equal to the electric angle θe2 when the electric current Id2 on the axis 'd' has approached to the preset-electric current I1, on the other hand, effectively prevents an increase in rotational angle of the rotor 46a of the motor MG2 to the electric angle θe2 at which the application torque balances with the attraction torque, thus restraining potential vibration of the rotor 46a around the electric angle θe2 at which the application torque balances with the attraction torque. Because of this reason, the starting electric angle θeset is set equal to the electric angle θe2 when the electric current Id2 on the axis 'd' has approached to the preset electric current I1.

After setting the starting electric angle θeset, the phase currents Iu2 and Iv2 are converted to the phase currents Id2 and Iq2 by coordinate conversion according to Equation (4) given above with substitution of the set starting electric angle θeset for θe2 (step S430). The CPU 40a then sets the electric current command Id2* to the preset electric current I1 and the electric current command Iq2* to 0, in order to enable the electric current to flow only the axis 'd' (step S440) and calculates the voltage commands Vd2* and Vq2* from the set electric current commands Id2* and Iq2* and the phase currents Id2 and Iq2 according to Equations (5) and (6) given above with substitution of the set starting electric angle θeset for θe2 (step S450). The voltage commands Vd2* and Vq2* are converted to voltage commands Vu2*, Vv2*, and Vw2* by coordinate conversion according to Equations (7) and (8) given above with substitution of the set starting electric angle θeset for θe2 (step S460). The CPU 40a converts the voltage commands Vu2*, Vv2*, and Vw2* after the coordinate conversion into a PWM signal for switching the inverter 42 (step S470), and outputs the converted PWM signal to the inverter 42 to control the operations of the motor MG2 (step S480). The motor lock command reception-time second motor control routine is then terminated. Controlling the operation of the motor MG2 to enable the electric current to flow through only the axis 'd' in the d-q coordinate system at the starting electric angle θeset effectively prevents rotation of the rotor 46a in the motor MG2 (that is, rotation of the ring gear shaft 32a) as mentioned above. The motor MG1 is controlled to motor and start the engine 22 in this state. Such control enables the engine 22 to be motored and started even at the gearshift position of the gearshift lever 81 set to the parking position.

As described above, in response to a starting instruction of the engine 22 at the gearshift position of the gearshift lever 81 set to the parking position, the hybrid vehicle 20B of the second embodiment motors the engine 22 to start with generating the fixed magnetic field on the stator 46b of the motor MG2 to prevent rotation of the rotor 46a with the permanent magnets. Like the first embodiment described previously, such control of the second embodiment enables the engine 22 to be motored and started even at the gearshift position of the gearshift lever 81 set to the parking position.

The hybrid vehicle 20B of the second embodiment sets the starting electric angle θeset equal to the electric angle θe2 when the electric current Id2 on the axis 'd' applied to the motor MG2 has approached to the preset electric current I1, in order to prevent rotation of the rotor 46a in the motor MG2. Compared with the procedure of setting the starting electric angle θeset equal to the electric angle θe2 prior to the approach of the electric current Id2 on the axis 'd' to the preset electric current I1 to prevent rotation of the rotor 46a in the motor MG2, the procedure of the second embodiment effectively prevents the electric angle θe2 of the motor MG2 from being significantly deviated from the starting electric angle θeset. This arrangement desirably prevents an increase in rotational angle of the rotor 46a to the electric angle θe2 at which the application torque output from the motor MG1 and applied to the ring gear shaft 32a balances with the attraction torque applied to the rotor 46a to make the direction of the fixed magnetic field identical with the direction of the axis 'd' in the rotor 46a.

For the simplicity of explanation, the above description takes into account only the magnet torque generated by the permanent magnets attached to the rotor 46a of the motor MG2 in the hybrid vehicle 20B of the second embodiment. In addition to the magnet torque, a reluctance torque generated by a core between the permanent magnets on the rotor 46a may be taken into account.

In the hybrid vehicle 20B of the second embodiment, the hybrid electronic control unit 70 starts motoring the engine 22 in response to reception of the motoring permission command from the motor ECU 40. One modification may start motoring the engine 22 after elapse of a preset reference time period tref. The reference time period tref may be set equal to or slightly longer than a required time period for approach of the electric current Id2 on the axis 'd' applied to the motor MG2 to the preset electric current I1 since transmission of the motor lock command from the hybrid electronic control unit 70 to the motor ECU 40.

The hybrid vehicle 20B of the second embodiment uses the starting electric angle θeset for the coordinate conversion (two phase-to-three phase conversion) from the voltage commands Vd2* and Vq2* to the voltage commands Vu2*, Vv2*, and Vw2*. An estimated electric angle θeset2 may be used in place of the starting electric angle θeset, when the coordinate conversion (two phase-to-three phase conversion) from the voltage commands Vd2* and Vq2* to the voltage commands Vu2*, Vv2*, and Vw2* is performed immediately after setting the starting electric angle θeset. The estimated electric angle θeset2 is an estimated value of the electric angle θe2 by taking into account elapse of a time period since setting of the starting electric angle θeset. In a time period between the setting of the starting electric angle θeset and the coordinate conversion (two phase-to-three phase conversion) from the voltage commands Vd2* and Vq2* to the voltage commands Vu2*, Vv2*, and Vw2*, the rotor 46a may be slightly rotated to cause a deviation of the electric angle θe2. After application of the electric currents to the motor MG2 to prevent rotation of the rotor 46a, either the starting electric angle θeset or the estimated electric angle θeset2 may be used for the coordinate conversion (two phase-to-three phase conversion) from the voltage commands Vd2* and Vq2* to the voltage commands Vu2*, Vv2*, and Vw2*.

In the hybrid vehicle 20B of the second embodiment, when the electric current Id2 on the axis 'd' has approached to the preset electric current I1, the motor ECU 40 sets the corresponding electric angle θe2 to the starting electric angle θeset and generates the fixed magnetic field on the stator 46b of the motor MG2 at the starting electric angle θeset. One modified procedure may set the corresponding electric angle θe2 to the starting electric angle θeset and generate the fixed magnetic field on the stator 46b of the motor MG2 at the starting electric angle θeset upon approach of the phase currents Iu2, Iv2, and Iw2 flowing through the three-phase coils of the motor MG2 to a preset range, instead of the approach of the electric current Id2 on the axis 'd' to the preset electric current I1.

The hybrid vehicle 20B of the second embodiment does not make check for a practical stop of the rotor 46a of the motor MG2 at the time of motoring the engine 22 to start. A practical stop of the rotor 46a may, however, be checked by determination of whether the difference between the current electric angle θe2 and the starting electric angle θeset is within a predetermined range, by determination of whether the difference between the current rotational position θm2 of the rotor 46a of the motor MG2 and the rotational position θm2 of the rotor 46a corresponding to the starting electric angle θeset is within a predetermined range, or by determination of whether the rotation speed Nm2 of the motor MG2 calculated from the rotational position θm2 of the rotor 46a is not higher than a preset rotation speed.

In the hybrid vehicle 20B of the second embodiment, the motor ECU 40 sets the starting electric angle θeset equal to the electric angle θe2 when the electric current Id2 on the axis 'd' has approached to the preset electric current I1. The starting electric angle θeset may alternatively be set equal to the electric angle θe2 before the approach of the electric current Id2 on the axis 'd' to the preset electric current I1, for example, to the electric angle θe2 on reception of the motor lock command from the hybrid electronic control unit 70.

In the hybrid vehicle 20B of the second embodiment, the motor ECU 40 controls the motor MG2 to prevent torque input and torque output from and to the ring gear shaft 32a before the electric current Id2 on the axis 'd' has approached to the preset electric current I1, that is, before the motor MG1 starts motoring the engine 22. The motor MG2 may alternatively be controlled to allow torque input and torque output from and to the ring gear shaft 32a. The motor MG2 may otherwise be controlled to generate a fixed magnetic field on the stator 46b of the motor MG2 to prevent rotation of the rotor 46a (that is, rotation of the ring gear shaft 32a).

The hybrid vehicle 20 of the first embodiment or the hybrid vehicle 20B of the second embodiment is equipped with the transmission 60 having the four different speeds. The transmission is, however, not restricted to have the four speeds but may have two or any greater number of speeds.

Figure 11:
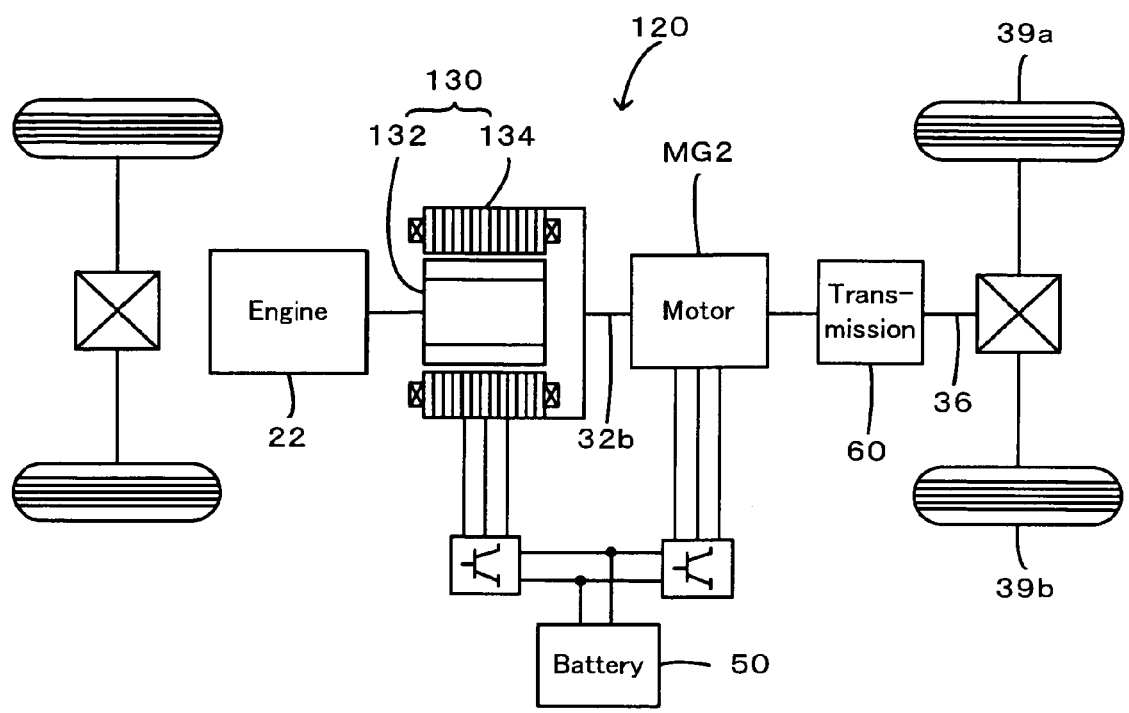
FIG. 11 schematically illustrates the configuration of another hybrid vehicle 120 in one modified example.

In the hybrid vehicle 20 of the first embodiment or the hybrid vehicle 20B of the second embodiment, the power of the engine 22 is output via the power distribution integration mechanism 30 to the ring gear shaft 32a or the rotating shaft connected via the transmission 60 to the driveshaft 36 linked with the drive wheels 39a and 39b. The technique of the invention is also applicable to a hybrid vehicle 120 of one modified structure shown in FIG. 11. The hybrid vehicle 120 of FIG. 11 is equipped with a pair-rotor motor 130. The pair-rotor motor 130 includes an inner rotor 132 connecting with the crankshaft 26 of the engine 22 and an outer rotor 134 connecting with the rotating shaft 32b connected via the transmission 60 to the driveshaft 36 to output power to the drive wheels 39a and 39b. The pair-rotor motor 130 transmits part of the output power of the engine 22 to the drive wheels 39a and 39b via the rotating shaft 32b, the transmission 60, and the driveshaft 36, while converting the residual engine output power into electric power.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The principle of the present invention is preferably applied to the manufacturing industries of vehicles.

What is claimed is:

1. A vehicle, comprising:
an internal combustion engine;
a motoring structure connected with an output shaft of the internal combustion engine and with a rotating shaft and configured to motor the internal combustion engine with output of power to the rotating shaft;
a motor configured to input and output power from and to the rotating shaft;
a transmission configured to transmit power with a change in speed between the rotating shaft and an axle of the vehicle and to decouple the rotating shaft from the axle at a gearshift position of a gearshift lever set to a parking position; and
a start controller configured to control the internal combustion engine, the motoring structure, and the motor, in response to a starting instruction of the internal combustion engine at the gearshift position of the gearshift lever set to the parking position, to motor and start the internal combustion engine with restriction of rotation of the rotating shaft by the motor.

2. The vehicle in accordance with claim 1, wherein the motor has a rotor connected with the rotating shaft and a stator arranged to drive and rotate the rotor by formation of a rotating magnetic field and accordingly enable power input and power output from and to the rotating shaft, and
the start controller controls the motor to fix a direction of the magnetic field formed on the stator and accordingly prevent rotation of the rotor.

3. The vehicle in accordance with claim 1, wherein the motoring structure includes:
a three shaft-type power input output assembly connected with three shafts, the output shaft of the internal combustion engine, the rotating shaft, and a third shaft and designed to input and output power to a residual shaft based on powers input from and output to any two shafts among the three shafts; and
a generator configured to input and output power from and to the third shaft.

4. The vehicle in accordance with claim 2, wherein the start controller applies a direct current to the motor to fix the direction of the magnetic field formed on the stator.

5. The vehicle in accordance with claim 2, the vehicle further including:
   a rotational position detector configured to detect a rotational position of the rotor in the motor; and
   a starting rotational position setting module configured to, at the gearshift position of the gearshift lever set to the parking position, set a starting rotational position equal to the detected rotational position before the start controller starts motoring the internal combustion engine,
   wherein the start controller controls the motor with the set starting rotational position to prevent rotation of the rotor.

6. The vehicle in accordance with claim 2, wherein the start controller controls the motor to prevent rotation of the rotor and controls the motoring structure to start motoring the internal combustion engine in a state of preventing rotation of the rotor.

7. The vehicle in accordance with claim 5, wherein the start controller applies an electric current to the motor to make the direction of the magnetic field formed on the stator substantially identical with a direction of a magnetic flux based on a field of the rotor at the set starting rotational position.

8. The vehicle in accordance with claim 5, wherein the motor is a multiphase alternating current motor, and
   the start controller calculates rotating coordinate system currents, which represent electric currents in a rotating coordinate system rotating in synchronism with rotation of the rotor, from electric currents applied to respective phases of the motor, calculates rotating coordinate system target voltages, which represent target voltages in the rotating coordinate system, from the calculated rotating coordinate system currents, calculates target voltages to be applied to the respective phases of the motor from the calculated rotating coordinate system target voltages, and controls the motor with the calculated target voltages to prevent rotation of the rotor.

9. The vehicle in accordance with claim 5, the vehicle further including:
   a rotation stop checking module configured to check whether the rotor is substantially at stop, based on the detected rotational position and the set starting rotational position.

10. The vehicle in accordance with claim 5, wherein the starting rotational position setting module sets the starting rotational position equal to a rotational position detected after application of a sufficient electric current to the motor for preventing rotation of the rotor, and
    the start controller controls the internal combustion engine, the motoring structure, and the motor to motor and start the internal combustion engine with prevention of rotation of the rotor after the starting rotational position setting module sets the starting rotational position.

11. The vehicle in accordance with claim 8, wherein the motor is a three-phase alternating current motor, and
    the start controller converts electric currents applied to respective phases of the motor to a d-axis current and a q-axis current as the rotating coordinate system currents by three phase-to-two phase conversion, sets a fixed value to a d-axis target current and a value '0' to a q-axis target current at the set starting rotational position, and sets a d-axis target voltage based on the set d-axis target current and the converted d-axis current and a q-axis target voltage based on the set q-axis target current and the converted q-axis current, as the rotating coordinate system target voltages.

12. The vehicle in accordance with claim 8, wherein the start controller calculates the rotating coordinate system currents from the set starting rotational position and the electric currents applied to the respective phases of the motor.

13. The vehicle in accordance with claim 8, wherein the start controller calculates the target voltages from the set starting rotational position and the calculated rotating coordinate system target voltages.

14. The vehicle in accordance with claim 8, wherein the start controller estimates a current rotational position of the rotor based on the set starting rotational position immediately after the starting rotational position setting module sets the starting rotational position, and calculates the target voltages from the estimated current rotational position of the rotor and the calculated rotating coordinate system target voltages.

15. The vehicle in accordance with claim 10, wherein the motor is a three-phase alternating current motor,
    the vehicle further including:
    an electric current level detector configured to convert electric currents applied to respective phases of the motor to a d-axis current and a q-axis current by three phase-to-two phase conversion at the gearshift position of the gearshift lever set to the parking position and to determine application of a sufficient electric current to the motor for preventing rotation of the rotor when the converted d-axis current is within a preset electric current range including a specific electric current value,
    wherein the starting rotational position setting module sets the starting rotational position based on a result of the determination by the electric current level detector.

16. The vehicle in accordance with claim 10, wherein the start controller controls the motor to prevent input and output of a driving force from and to the rotating shaft before the starting rotational position setting module sets the starting rotational position.

17. A control method of a vehicle, the vehicle including: an internal combustion engine; a motoring structure connected with an output shaft of the internal combustion engine and with a rotating shaft and configured to motor the internal combustion engine with output of power to the rotating shaft; a motor configured to input and output power from and to the rotating shaft; and a transmission configured to transmit power with a change in speed between the rotating shaft and an axle of the vehicle and to decouple the rotating shaft from the axle at a gearshift position of a gearshift lever set to a parking position,
    in response to a starting instruction of the internal combustion engine at the gearshift position of the gearshift lever set to the parking position, the control method controlling the internal combustion engine, the motoring structure, and the motor to motor and start the internal combustion engine with restriction of rotation of the rotating shaft by the motor.

18. The control method of the vehicle in accordance with claim 17, wherein the motor has a rotor connected with the rotating shaft and a stator arranged to drive and rotate the rotor by formation of a rotating magnetic field and accordingly enable power input and power output from and to the rotating shaft,
    the control method controlling the motor to fix a direction of the magnetic field formed on the stator and accordingly prevent rotation of the rotor.

* * * * *